Dec. 1, 1959 J. V. FELTER 2,915,088
SEAMED PIPE OF SHEET MATERIAL
Filed April 17, 1957
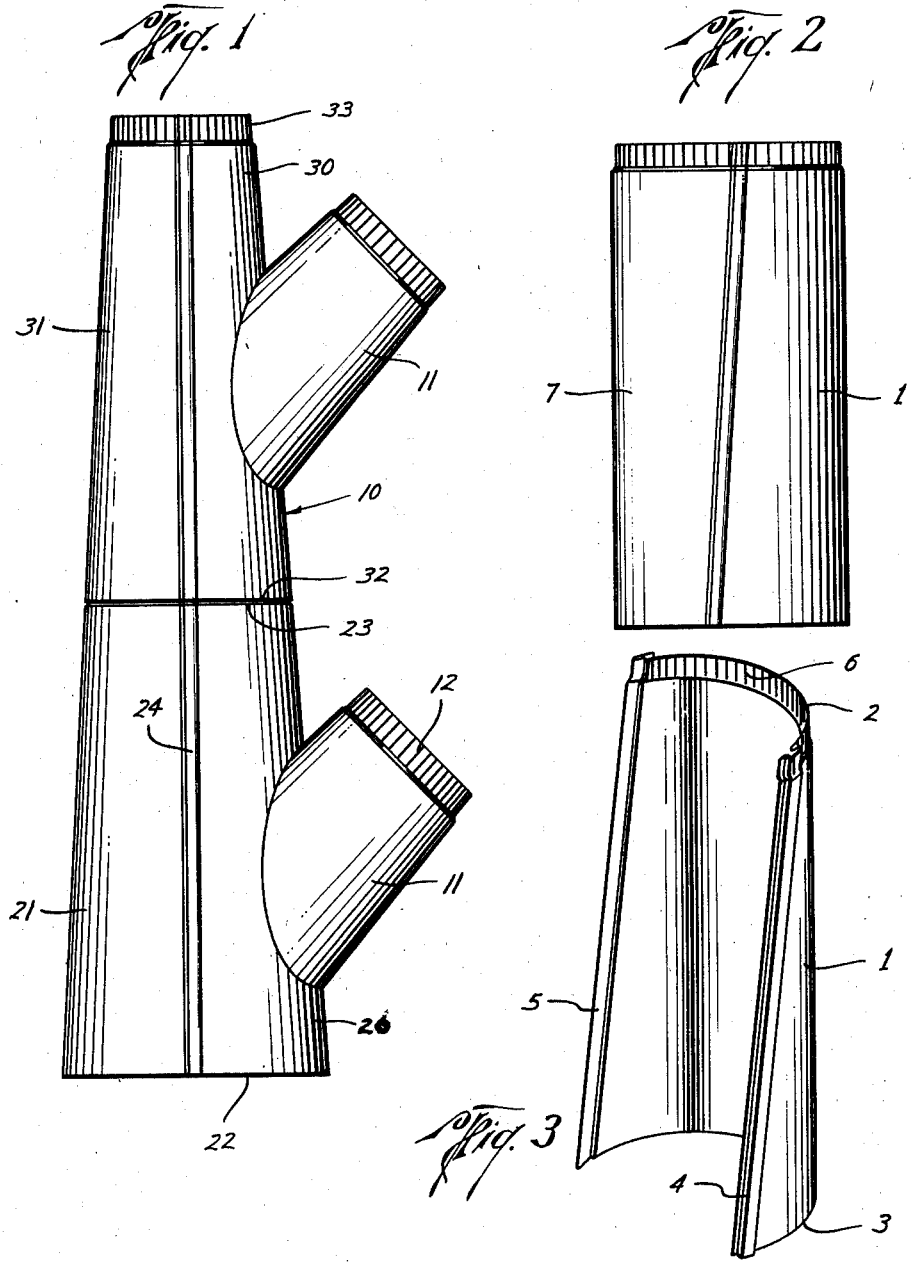
John V. Felter
INVENTOR.
BY *Arnold and Stidham*
ATTORNEYS

United States Patent Office 2,915,088
Patented Dec. 1, 1959

2,915,088

SEAMED PIPE OF SHEET MATERIAL

John V. Felter, Austin, Tex.

Application April 17, 1957, Serial No. 653,422

1 Claim. (Cl. 138—75)

This invention relates to pipe of sheet material and more particularly, to interchangeable pipe section components of various selected sizes which such components can be selected and combined to form pipe sections of desired sizes.

Conventional sheet metal pipe is formed in cylindrical or frustro-conical sections of predetermined diameter. With such pipe sections it is necessary to maintain on hand a substantial stock of straight sections, reducing sections and Y-sections in order to fill the requirements of the building trade. Since such sections are not adapted for nesting, the storage space usually required by each is equal to its full cross-section area. Even in the smaller diameter pipe sizes, the number of types and lengths that must be kept in stock renders storage space a real problem and in some of the larger diameter sizes the maintenance of a substantial inventory is virtually prohibitive.

It is, therefore, an object of my invention to provide interchangeable elements of pipe sections which may be combined with other elements to form pipe sections having desired diameters at both ends.

It is a further object of my invention to provide pipe section elements of a few selected sizes which may be combined to form pipe sections of a wide variety of sizes.

It is a further object of my invention to provide interchangeable pipe section elements which may be nested together to facilitate storage.

It is a further of my invention to provide pipe section components which may be manufactured economically and which are simple to assemble.

In carrying out my invention I provide a plurality of concave sheet metal shells, all having lateral edges of the same predetermined length and each having arcuate edges of selected radii at opposite ends thereof. The shells have interlocking means along their lateral edges. Since the shells are concave and of the same length, they may be nested together to facilitate storage and stripping. In forming a length of pipe, it is merely necessary to select appropriate shells having radii at opposite ends which together will produce a tubular section having the desired diameter at each end. Since the shells are of the same length along the lateral edges they are interchangeable; consequently, shells of a few selected sizes are sufficient to produce a considerable number of tubular pipe sections when combined in different ways with each other.

Objects and advantages other than those set forth above will be apparent from the following description when read in connection with the accompanying drawings, in which:

Fig. 1 is a view in elevation of a tapered sheet material pipe formed from my pipe section components;

Fig. 2 is an elevation view of a cylindrical pipe section formed from my pipe section components; and Fig. 3 is a view in perspective of my pipe section component.

Referring now to Fig. 3 of the drawings there is shown a pipe section component comprising a concave shell 1 of flexible sheet metal or the like. One arcuate end 2 of the shell is of a predetermined radius or arcuate length and the other end 3 is also of a predetermined radius. The radii at opposite ends may be the same but, for greater flexibility in construction, it is preferred that they be different. The lateral edges 4 and 5 of all shells 1 are of the same length and have thereon edge interlocking means. While the specific structure of the interlocking means used is not material to my invention, I have shown for purposes of illustration a grooved receptacle or female lock element along one lateral edge 4 and a flange or male element, adapted to snap into the female element on the lateral edge 5 of another pipe section component.

A crimp 6 is formed in one end of each shell along the edge thereof to reduce the periphery of the composite pipe section sufficient to permit reception thereof in an uncrimped end of another section to form a pipe length as shown at 10 in Fig. 1.

Some of the shells have extending therefrom and in communication with the interior thereof a frustro-conical branch conduit 11 (Fig. 1) at the crimped outer end of which 12 additional pipe sections formed from shells of the type illustrated may be attached to form branch lines from the main pipe conduit 10.

Since all lateral edges of my shell components are of the same length, it is apparent that a few of the shells illustrated may be combined to produce tubular pipe sections over a wide range of sizes. For example, a shell component with one arcuate end having a radius of 10 inches and the other arcuate end having a radius of 8 inches may be combined with a 12 to 10 inch radius shell having corresponding interlocking edges to form a reducing section having opposite end diameters of 22 inches and 18 inches respectively; it may be combined with an identical 10 to 8 inch radius shell to form a reducing section having opposite end diameters of 20 inches and 16 inches; or it may even be combined with an increasing 14 to 16 inch shell wherein the male and female snap lock elements are reversed, as shown at 7 in Fig. 2, to form a 24 inch diameter substantially cylindrical section; and so forth. In short, all shell components have lateral edges of the same length so that they may be selected by their opposite end radii and combined to produce reducing or enlarging sections of varying degree, as well as cylindrical sections.

In Fig. 1, I have shown a length of sheet material pipe formed from a plurality of my shell components. To form the pipe, there is selected a pair of shell components 20 and 21 having arcuate edges at one end 22 of radii which total the desired initial diameter and arcuate edges at the opposite end 23 of radii which total the desired first joint diameter. The lateral edges 24 are then interlocked to form the first pipe section. If desired, either or both of the shell components may include a Y-section 11 from which branch lines may be constructed. Then there is selected a second pair of shell components 30 and 31 having arcuate edges at end 32 of radii which total the previously determined first joint periphery and arcuate edges at the opposite end 33 of radii which total a desired second joint periphery. The crimped end 23 of the first section so formed is nested into the uncrimped end 32 of the second section to form a length of pipe. Other sections are formed and joined in a like manner. Again, since the shell components are of the same length, all of the components 20, 21, 30 and 31 are interchangeable so that the pipe section diameters may be controlled closely with a minimum amount of shell sizes on stock.

Before assembly the semi-cylindrical shells may be nested in face to face relationship so that a substantial supply of shell components can be stored in a minimum space. Moreover, since the branch lines 11 taper the Y-section components such as 20 and 30 can also be nested so that storage space is preserved throughout. Storage savings are further effected by these components because of the wide range of sizes that can be accomplished by a relatively few components through permutations in selecting appropriate pairs of shells to form desired pipe sections.

While I have illustrated and described a preferred embodiment of my invention, it is apparent that various changes in size, shape and materials, as well as in details of construction, may be made without departing from the spirit of my invention or the scope of the appended claim.

Having described my invention, I claim:

A tubular duct comprising a plurality of concave sheets, the arcuate edges of each of said sheets being of selected radii, the opposite arcuate edges of at least one of said sheets being of different radii, the lateral edges of all of said sheets being continuous and straight and of the same predetermined length, interlocking means along said lateral edges, said sheets being arranged in pairs with the interlocking means thereof engaged, the adjacent arcuate edges of each of said pairs forming circular ends of a diameter equal to the sum of the radii of said adjacent arcuate edges, said pairs being arranged with circulr ends of equal diameter connected together in axial alignment.

References Cited in the file of this patent
UNITED STATES PATENTS

| | | |
|---|---|---|
| 722,398 | Bock | Mar. 10, 1903 |
| 893,968 | Allington | July 21, 1908 |